United States Patent
Arsan et al.

(10) Patent No.: US 8,435,589 B2
(45) Date of Patent: *May 7, 2013

(54) NO EVAPORATION PROCESS TO PRODUCE GUM BASED FRUIT SNACKS

(75) Inventors: Jad Arsan, Shanghai (CN); Mayur Valanju, Brookfield, WI (US); Andrew Marwaha, Cambridge, MA (US); Michael Bottko, Battle Lake, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,844

(22) Filed: Mar. 28, 2012

(65) Prior Publication Data
US 2012/0183673 A1  Jul. 19, 2012

Related U.S. Application Data

(63) Continuation of application No. 11/570,278, filed as application No. PCT/US2005/005670 on Feb. 23, 2005, now Pat. No. 8,158,182.

(60) Provisional application No. 60/585,869, filed on Jul. 7, 2004.

(51) Int. Cl.
*A23L 1/05* (2006.01)

(52) U.S. Cl.
USPC .......................... 426/573; 426/520

(58) Field of Classification Search .......... 426/250, 426/311, 573, 577–578, 615, 660
See application file for complete search history.

(56) References Cited

U.S. PATENT DOCUMENTS

| | | | |
|---|---|---|---|
| 3,586,513 | A | 6/1971 | Horn et al. |
| 3,806,617 | A | 4/1974 | Smylie et al. |
| 4,335,155 | A | 6/1982 | Blake et al. |
| 4,567,055 | A | 1/1986 | Moore |
| 4,681,770 | A | 7/1987 | Palmer |
| 4,847,098 | A | 7/1989 | Langler |
| 4,853,236 | A | 8/1989 | Langler |
| 5,208,059 | A | 5/1993 | Dubowik et al. |
| 5,455,053 | A | 10/1995 | Zimmermann et al. |
| 5,840,354 | A | 11/1998 | Baumann et al. |
| 5,942,268 | A | 8/1999 | Zimmermann et al. |
| 2003/0008054 | A1 | 1/2003 | Gordon et al. |

*Primary Examiner* — Patricia George
(74) *Attorney, Agent, or Firm* — Everett D. Diederiks, Jr.; Gregory P. Kaihoi

(57) ABSTRACT

The present invention resides in methods of preparing low moisture sweetened fruit product base. The methods comprise the steps in sequence of forming a hot sweetened intermediate moisture flowable fruit or confectionary composition or slurry by extended cooking with agitation at final moisture levels and a solids content ranging from about 85 to 92° Brix; and without intervening drying, forming the hot slurry into sized and shaped individual pieces.

20 Claims, 1 Drawing Sheet

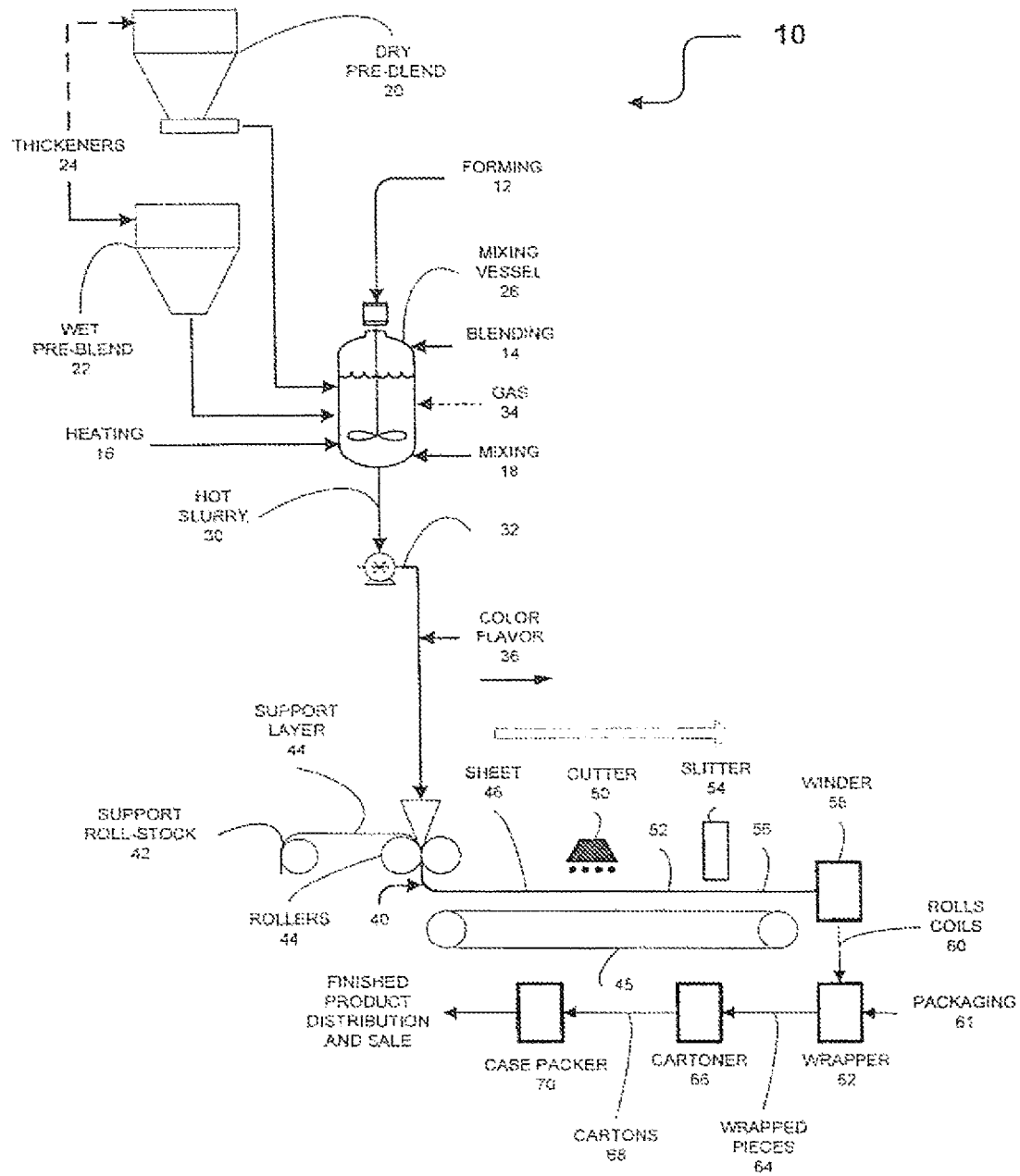

NO EVAPORATION PROCESS TO PRODUCE GUM BASED FRUIT SNACKS

CROSS-REFERENCE TO RELATED APPLICATIONS

The present application represents a continuation of U.S. patent application Ser. No. 11/570,278 filed Dec. 8, 2006, now U.S. Pat. No. 8,158,182, which represents a National Phase Application of PCT/US2005/005670 filed Feb. 23, 2005 which claims the benefit of U.S. Provisional Application Ser. No. 60/585,869 filed Jul. 7, 2004.

BACKGROUND OF THE INVENTION

The present invention relates to food products and to their methods of preparation. More particular, the present invention relates to intermediate moisture food products especially dried fruit based food products and to their methods of preparation.

Wholesome snacks prepared from sweetened intermediate moisture shelf stable fruit or "fruit snacks" herein have recently become popular food items. These compositions are sold in various physical forms and shapes such as: 1) in rolled sheet form; 2) in rolled strip form; 3) in string form mounted on a U-board; 4) soft center filled pieces, and 5) in gelled bite size pieces of various shapes or in gelled bite size piece form prepared by starch molding. The products are typically packaged in a moisture impermeable container such as flexible laminated film pouch fabricated to include a moisture barrier layer.

In other variations, all or a portion of the fruit material is substituted with pure sugars. Such low fruit, high sugar formulations can be flavored with fruit flavors and/or other flavors. Within this general similarity, however, the particular methods of preparation, product formulations and apparatus used to prepare particular products vary considerably. Moreover, such variations are highly interdependent. Formulations and method steps suitable for one product form might or might not be suitable for another product form.

Particularly popular products are in rolled sheet form such as are sold under the Fruit Roll-Ups brand. Popular products rolled strip form are sold under the Fruit By The Foot brand (see also, commonly assigned U.S. Pat. No. 5,455,053 entitled "Rolled Food Item" issued Oct. 3, 1995). Food products in string form mounted on a U-board are sold under the String Thing® mark while other products in bite size pieces of various shapes are sold under various brands. (See, for example, commonly assigned U.S. Pat. No. 5,942,268 entitled "Embossed Shape Food Item" issued Aug. 24, 1999 to Zimmermann et al.). Soft center filled pieces products are described in U.S. Pat. No. 4,853,236 entitled "Dual Textured Food Piece Of Enhanced Stability Using An Oil In Water Emulsion" (issued Mar. 18, 1988 to Langler et al.). While apparatus and fabrication methods therefor are described in U.S. Pat. No. 5,208,059 entitled "Dual Textured Food Piece Fabrication Apparatus" (issued Jun. 10, 1992 to Dubowik et al.).

These dried fruit products are especially popular with children, particularly as snack or convenience foods. To continue to appeal to children, manufacturers must introduce frequent changes to such products. For example, the shapes of the products can be changed to employ currently popular character-shapes such as from a movie, television show, cartoons, etc. Also, such products can be fortified with vitamins and minerals, especially calcium for growing children.

Broadly, these products are prepared from wet mixtures of the various fruit materials and added ingredients with extra water, cooked and worked at elevated temperatures and dried with heat or vacuum or a combination of the two to desired moisture contents to form hot plastic paste or fluid formable fruit masses. The formable fruit masses are then formed into articles of desired shapes and sizes. The present invention is directed toward improvements in the methods of preparation of the hot plastic paste or fluid formable fruit masses that can then be formed into various suitable shaped and sized pieces.

While the present invention can be used in connection with various such firm intermediate moisture products such as gelled fruit based confections (i.e., those with sufficient gel strength to retain their shape without need for supplemental support or self supporting), the invention is particularly addressed to pliable film intermediate moisture fruit solid products in the rolled sheet form or in the rolled strip form that are typically supported on a removable backing paper or other packaging support structure to retain their shape.

Generally, prior methods of preparation involve preparing wet mixtures of the sweetened fruit ingredients that range from about 55-75° Brix (i.e., about 55%-75% solids) and which are then dried to near finish moisture values of about 83-93° Brix before being formed into sized and shaped pieces. The wet mixtures are made with additional moisture for good reasons such as to facilitate hydration (and thus functionality) of the (expensive) thickening agents, facilitate physical mixing and facilitate homogenous blending of component ingredients.

However, removal of the excess moisture unfortunately requires additional process steps and requires employment of extra pipes, pumps, vessels and drying equipment leading to bottlenecks in production as well as increases in both capital and operating (e.g., utilities such as steam) costs. Such extra cost concerns are especially important in establishing these types of products in many emergent market countries. Also, with increasing import competition from low cost countries, the need for reduced cost technologies for the production of these types of products in industrialized countries is great.

Also, the need for finish-drying burdens product fortification. Many vitamins are heat sensitive and degrade during the drying step. Mineral fortification especially with calcium is difficult due to the scaling problems on the drying equipment from common calcium fortification ingredients.

In view of the current state of the intermediate moisture food art, there is a continuing need for new and improved formulations and methods for preparing intermediate moisture shaped food products.

The present invention satisfies this need by providing intermediate compositions and methods for preparing such fruit products that require no or minimal finish drying and thus reduced manufacturing costs. In part, the present invention involves providing a hot viscous sweetened fruit fluid or slurry of increased solids intermediate product that nonetheless has lower or comparable viscosities that allows for successful forming into shaped intermediate moisture food products especially in film form.

In particular, it is an object of the present invention to provide methods for preparing fortified sweetened intermediate moisture fruit compositions.

Still another object of the present invention is to provide high solids content gellable food slurry product intermediates useful in the preparation of intermediate moisture food products.

It has been surprisingly discovered that the above objectives can be realized and superior sweetened fruit products provided by formulating compositions, comprising: nutritive carbohydrate sweeteners especially those provided by fruit solids, bulking agent (s), and moisture. The present invention further provides novel methods of preparation of such products involving characterized by reduced or no drying times.

BRIEF DESCRIPTION OF THE DRAWINGS

The illustrative embodiment may best be described by reference to the accompanying drawings where:

FIG. 1 is schematic flow diagram of a process of preparing a low moisture sweetened fruit product in accordance with the present invention.

SUMMARY OF THE INVENTION

In its process aspect, the present invention resides in methods of preparing low moisture sweetened fruit product base. The methods comprise the steps in sequence of:

forming a hot sweetened intermediate moisture flowable fruit or confectionary composition or slurry by extended cooking with agitation at final moisture levels and a solids content ranging from about 85 to 92° Brix; and without intervening drying, forming the hot slurry into sized and shaped individual pieces.

In one product aspect, the present invention is directed towards intermediate confection products prepared from the that are useful for forming into sized and shaped finished sweetened, intermediate moisture food pieces. These intermediate products comprise about 30-80% (wet basis) mono- and di-saccharides;
about 5% to 40% (wet basis) bulking agent;
about 7 to 17% moisture;
about 0.5% to 5% hydratable thickeners; and
$A_w$ of less than 0.65.

The products are generally in a rolled sheet or coiled ribbon form preferably in mounted on a packaging support layer and are disposed within moisture proof packaging. The dried plastic food confection product sheets or ribbons have a thickness of about 0.2-1.5mm. The packaging can be fabricated from a flexible packaging film with moisture barrier properties.

DETAILED DESCRIPTION OF THE INVENTION

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The present invention provides improved, intermediate moisture food products especially fruit based food products and to their methods of preparation. Each of these components as well as product properties, preparation and use are described in detail below.

Throughout the specification and claims, percentages are by weight and temperatures in degrees Centigrade unless otherwise indicated. Each of the referenced patents is incorporated herein by reference.

Referring now to FIG. 1, there is shown a schematic flow diagram of one method of preparation embodiment of the present invention generally designated by reference numeral 10. Methods of preparation 10 can include a first step 12 of forming a hot sweetened intermediate moisture flowable fruit or confectionary composition or slurry 30. Forming step 12 can comprise a first sub-step 14 of blending fruit ingredients (to provide fruit solids), sweeteners, bulking agents, hydrateable thickeners and moisture to form a low moisture sweetened fruit blend, and then a sub-step of heating 16 the fruit blend to form a hot fruit blend and a sub-step of mixing 18 the hot fruit blend for times sufficient to hydrate the thickeners to provide a hot viscous low moisture confection slurry 30. In less preferred embodiments, the fruit material can be partially or completely replaced with common confectionary ingredients to provide confection or candy products.

In preferred form, forming the sweetened fruit blend 30 can conveniently involve the preparation of a pre-blend of dry ingredients 20 as well as a pre-blend of wet ingredients 22. The dry pre-blend 20 and wet pre-blend 22 can be added at room temperature to a mixing vessel 24. If desired, wet pre-blend 22 can be heated prior to addition to the mixing vessel 24 to addition temperatures ranging from about 30-100° C., preferably about 45 to 60° C. Volumetrically, wet pre-blend 22 can range from about 20% to 40% of the fruit blend 14, preferably about 30% while the dry pre-blend 20 can range from about 60%-80%, preferably about 70%. In one variation, the hydrateable thickeners 24 are provided-in dry form and are added together with the dry ingredients to form—the dry pre-blend 20. In another the thickeners 24 are added to the wet pre-blend 22 and admixed until hydrated with the moisture available in the wet pre-blend.

In preferred form, the mixing vessel 24 is a tank adapted to be heated by indirect heat such as a jacketed mixing tank or reactor. Indirect heat can be supplied by any convenient means such as electrical heating, or by circulating a heating medium in a jacket to the vessel such as Dowtherm or, in preferred form, steam. The vessel 24 is equipped with a means for mixing or agitation the blend 14 such as a mixing paddle or blade. Since the fruit blend can be thick and pasty in initial physical form, the motor for the agitator should be sufficiently powered to provide vigorous agitation. By indirect heating, addition of supplemental moisture such as would be occasioned by direct steam addition of the fruit blend can be avoided. However, in another embodiment at lest some heating is made through steam (e.g. about 15 psig.-180 KPA) heating. In this variation, of course, adjustments to the supplemental water addition should be made to accommodate the moisture gains from any steam condensations. Also, in preferred form, the mixing vessel 24 is sealed to prevent moisture loss during the heating or cooking step as well as to minimize loss of delicate flavor notes. Suitable for use herein as the mixing vessel is a common kettle. In particular, good results have been obtained employing a Model VMC Versa-Mix available from Charles Ross & Sons Company ("Ross") which is a high shear multi-shaft mixer. This Ross mixer provides positive pressure or press discharge. The positive pressure (by air) or press discharge facilitates discharge of the very viscous hydrated fruit slurry. Less preferred for use herein are such ribbon blender or a "Z" arm blender. Extruders, particularly twin screw extruders typically have difficulty providing sufficient residence time to practice the present extended heating step and thus are not the preferred apparatus to practice the present forming step. Additional jacketed piping can be added after the twin screw to provide the appropriate residence time.

Of course, some residual moisture is associated even with the dry ingredients in the dry pre-blend 20. However, the wet pre-blend 22 is formulated with this residual moisture in mind to provide the requisite amount of moisture to provide the finished hydrated flowable fruit or confectionary 30 with its finished moisture content. While in the preferred form mixing vessel 24 is sealed to prevent moisture loss, in certain embodiments, the mixing vessel 24 is not completely sealed or is opened intermittently and thus operates at atmospheric pressure during the heating step 16 whereby small amounts (0-3%) of moisture loss can occur. In such instances, the wet pre-blend 22 is formulated with extra water to accommodate such minor moisture losses.

Good results are obtained when the fruit blend is heated to temperatures ranging from about 70-100° C., preferably about 82-87° C. The heating and mixing sub-steps 16 and 18 or agitated cooking as used herein are continued with vigorous agitation for times sufficient to hydrate the thickening ingredients to provide the viscous hydrated fruit or confection blend 30. Good results are obtained when the agitated cooking is practiced for times ranging from about 15 to 60 minutes. While the agitated cooking can be extended beyond 60 minutes, no particular benefit is derived from such extended cooking times. Preferred agitated cooking times range from about 20-40 minutes. In preferred form, the agitation is practiced such as to impart about 15-120 Watt-hour/kilogram ("Wh/kg.") of Specific Mechanical Energy ("SME") to the hot slurry, preferably about 30-90 Wh/kg. of SME.

The hydrated hot sweetened intermediate moisture flowable fruit or confectionary composition 30 so prepared is characterized by a molasses (at room temperature) type consistency even at the elevated temperatures at which the heating step is practiced. The viscous hot material or slurry 30 can have a viscosity ranging from about 500,000-2,000,000 cps and thus is in the form of a pumpable fluid. Care must be taken in selection and formulation of the amount and type of thickeners that in combination with the other ingredients not only provide for desirable end product eating qualities and other characteristics but also do not result in viscosities in hot material 30 that are unpumpable or unworkable. In preferred form, the viscous mixture is not aerated other than minor amounts of air entrained during the mixing step. The hot slurry 30 is at its intended finished moisture content and is characterized by a solids content ranging from about 83 to 93° Brix.

Conveniently, the preparation step 12 is practiced in a batch mode although continuous and semi-continuous production is also contemplated.

It will be appreciated that in the present invention that the slurry 30 is immediately available to practicing the forming step without the need for an intervening drying step that heretofore has been recognized as being essential in the art. For example, as described in U.S. Pat. No. 3,806,617 (issued Apr. 23, 1974 to Smylie et al.), large steam heated drum driers have been used in the past to practice the essential drying step. As a result of the elimination of the drying step in the present invention, significant reductions in both capital equipment (drum driers, steam supply, vapor capture and treatment equipment) and operating costs (steam, labor, equipment maintenance, etc) can be obtained. Also, since the available floor space in manufacturing facilities is often limited and expensive when available, it is an advantage the footprint for the equipment to practice the present invention is greatly reduced.

Likewise, in the practicing of the present methods, there is no need for the addition of a gel setting ingredient such as calcium ingredient (for calcium setting thickening agents) or an acidulant (for acid setting thickening agents) or for an additional heating step for heat set gelling agents. However, in contemplated variations of the present invention employing such types of supplemental thickening agents, such thickeners setting compositions can be added after the extended cooking step. In one convenient variation, these additives can be added along with or at the color and flavor addition station or step.

The hot viscous slurry 30 can be difficult to convey. In one embodiment, a positive displacement pump 32 can be used to convey the slurry 30 from mixing vessel 24 to the piece forming step 40. To facilitate providing pump 32 with a positive head for pumping, mixing vessel 24 can be positioned above the forming step 40 to have gravity provide or at least assist in providing positive head to pump 32. In another variation, the mixing vessel 24 can be sealed and supplied with a gas 34 such as air or nitrogen to supply at least some or all of positive head to the pump. If convenient; the gas supply can be added at the end of the heating step or during the agitated cooking. Of course, combinations of gravity feed and vessel pressurization can be practiced to facilitate the conveyance action of pump 32.

FIG. 1 further illustrate that the present methods can further involve post cooking adding minor supplemental ingredients such as colors and flavors 36 to the hot slurry. In preferred variations, the hot slurry 30 is formulated using bland or neutral flavored fruit ingredients especially white grape and/or pears juices, nectars and purees. A single batch or source of bland or white base slurry 30 can be split and fed to one or more forming lines. Each forming line can be adapted to provide a single color and or flavor by appropriate addition of color and flavor. In still other variations, vitamins and minerals can be added along with or separately added to the colors and flavors. Any suitable technique for uniformly blending the slurry 30 with flavor and color can be employed. Preferred for use herein for practicing the forming of a well blended homogeneous colored and flavored or fortified hot slurry 30 is to employ in-line static mixers since the addition is accomplished with minimal shear being imparted.

FIG. 1 further illustrates that the present methods can additionally comprise the step of forming 40 the slurry 30 into sized and shaped individual pieces 60. In one preferred embodiment, the forming step 40 is practiced employing the apparatus and techniques described in U.S. Pat. No. 5,205, 106 to form rolled fruit coils. More specifically, a sheet 46 of food material is formed preferably mounted upon an inedible support layers 44 is supplied such as from roll-stock 42 such as a paperboard or, in one preferred form, parchment paper treated with a antistick or release agent (e.g., silicon). In other variations, the anti-stick or release agent (e.g., oil) is applied directly to the confection roll so that the support layers can be eliminated. In preferred practice, the hot slurry 30 is fed to a pair of counter rotating forming rollers 44 along with roll stock 42 to form one or more continuous sheets 46. Typical shapes include thin films (whether parallelograms or rolls), bars, strings or ropes, and/or bite-sized nuggets. Sheets 46 can be advanced along a belt conveyor 45 to ribbon cutters(s) 50 that cut or section sheets 46 into continuous ribbons or rolls 52. The ribbons or rolls 52 can be cut by cross cutters 54 into sized individual pieces to form individual strips or sheets 56. The sheets or strips can be wound or formed by a winder or roller 58 into roll or coils or otherwise formed into finished product pieces 60. In commercial practice, up to 32 individual continuous sheets or ribbons can be simultaneously formed by a single set or rollers 44 or equivalent means for dispensing the hot slurry 30 to form a sheet.

A particularly desirable form is a roll product. The fruit composition is formed into an extended strip of about 10 to 30 mm in width and from 50 to 150 cm in length, about 0.2 to 1.5 mm, preferably about 0.5 to 1.5 mm and for best results about 0.5 to 8 mm in thickness, mounted upon a slightly larger film substrate (e.g., having a margin of 0.1 to 2 mm). The product is wound to form a roll having 5 to 15 turns. The roll can be secured in a wound configuration with a peripheral label or by other means.

It will be appreciated that while the described forming rollers 44 can be warm, the rollers 44 are to be distinguished from drum driers of the prior art. In certain known processes, drum driers are used to dry a cooked confection slurry to remove excess moisture to reduce the slurry to final moisture contents before the present forming step. It is an advantage of the present invention that such intermediate drying steps can be eliminated and expensive bulky equipment need to practice such intermediate moisture removal step can likewise be eliminated.

In other variations, the forming rollers can be substituted for other means for dispensing the hot slurry such as manifold or ganged array of positive displacement pumps. For example, the slurry can be extruded to be formed into one or more strings or ropes.

The finished products are soft, pliable, tearable products of both good flavor and eating quality. The food products so formed are characterized by being nutritious, wholesome snacks. The finished products have a water activity of 0.65 or less. Preferred product herein have water activity values ranging from about 0.5 to 0.6 and a moisture content of 7 to 17%, preferably about 9 to 15%.

FIG. 1 further illustrates that the present methods of preparation can additionally comprise the step packaging 61 the individually sized and shaped product pieces 60 into suitable food packaging to form wrapped or packaged pieces 64 as the finished product herein. Conveniently, the pieces 60 as in moisture proof pouches fabricated from sealable flexible film packaging material. In other less preferred variations, the food material is formed into rolls or coils without a support layer and likewise packaged. In certain variations, pieces are individually wrapped while in other variations a plurality or multiplicity of individual pieces are wrapped in a single package.

FIG. 1 further depicts that the finished product wrapped pieces 64 can be then further processed to combine a number (e.g., 1 to 12, preferably 6-8) of wrapped pieces such as in cartoner 66 to form cartons 68. Cartons 68 in turn can be fed to a case packer 70 to form cases of product for final distribution and sale.

In the most preferred form, finished food 60 is a sweetened dehyrated fruit-based material typically referred to in the art as a fruit leather which can be derived from fruit purees and in the most preferred form is of the same type as utilized in the first, solid or "hard" portion or region of the dual textured food piece described in U.S. Pat. No. 4,847,098 issued Jul. 11, 1989 to J. E. Langler and in U.S. Pat. No. 4,853,236 issued Aug. 1, 1989 to J. E. Langler, each entitled Dual Textured Food Piece of Enhanced Stability while in other embodiments can be fabricated from the compositions described in U.S. Pat. No. 4,681,770 "Fruit Products Containing Flaked Grains" (issued Jul. 21, 1987 to K. L. Palmer), and each of which is hereby incorporated herein by reference.

Sweeteners

A principal essential component of the present invention food compositions and food products prepared therefrom is one or more nutritive carbohydrate sweeteners or sugars. The present intermediate moisture compositions essentially comprise about 55% to about 80% dry weight basis of such nutritive carbohydrate sweeteners, preferably about 55% to about 70%, and for best results about 60% to about 65%. Such sugars not only provide taste and nutritional properties but also influence the texture and structure of the present products.

Nutritive carbohydrate sweeteners are well known in the art and the skilled artisan will have no difficulty in selecting particular ingredients for use herein as the nutritive carbohydrate sweetener component. Generally, however, the term "nutritive carbohydrate sweetening agent" is used herein to mean those typical purified sweetening agents conventionally used in food products. Of course, the present nutritive carbohydrate-sweetening agents are to be distinguished from non-nutritive carbohydrate high potency sweetening agents such as saccharine, cyclamate, sucralose and the like. Additionally, the present nutritive carbohydrate-sweetening agents are to be distinguished from such protein-based sweetening agents as aspartame, thaumatin, and monellin.

Suitable materials for use as nutritive carbohydrate sweetening agents are well known in the art. Examples of sweetening agents include both monosaccharide and disaccharide sugars such as sucrose, invert sugar, dextrose, lactose, honey, maltose, fructose, maple syrup and corn syrup or corn syrup solids. Preferred pure nutritive carbohydrate sweetening agents are those selected from the group consisting of sucrose, glucose, fructose, corn syrup solids, and honey. Highly preferred nutritive carbohydrate sweetening agents are those selected from the group consisting of sucrose, corn syrup solids, dextrose, maltose and fructose. Of course, mixtures of the above-noted materials are contemplated herein. Preferred for use herein is a combination of sucrose, corn syrup and fruit juice solids.

In a preferred embodiment, the ratio of monosaccharide to disaccharide sweeteners is controlled so as to minimize the development of unwanted properties in the finished food product over storage such as the development of crystals. To that end, the ratio can be and preferably does range from about 0.5:1 to about 1.8:1, and more preferably, about 0.7:1 to about 1.5:1.

Preferred for use herein is powdered sugar since the finished products exhibit less processing time. If granular sugar is used, additional processing time is necessary in order to dissolve the crystals.

Fruit Ingredients

In preferred embodiments, the food compositions herein and intermediate moisture products prepared therefrom are fruit products. While in the present description particular attention is made to these fruit based preferred embodiments, the skilled artisan will appreciate that other non fruit embodiments can be practiced. For example, in certain embodiments, the finished food products are candies or confections. In certain variations, such candies or confections can even be fruit flavored although containing no fruit ingredients other than flavors.

In such preferred fruit based embodiments, the food compositions and intermediate moisture products prepared therefrom are further essentially characterized by having at least a portion of the nutritive carbohydrate sweeteners as being provided by or from fruit sources or fruit solids. The fruit solids can be derived from fruit purees or juices prepared from whole fruit flesh or if such purees have been partially dehydrated, fruit paste. The term "puree" has been used in the art to refer to both heat treated, e.g., boiled and untreated food pulp. As used herein, however, "puree" is meant to refer both to heat and non-heat-treated whole fruit pieces, that have been mechanically transformed into fluids. Thus, the present comminuted fruit material can be distinguished from discrete individual pieces of intact fruit flesh.

Both unseeded and, preferably, deseeded purees can be used. Fruit puree generally contains about 35 to 90% moisture. Other edible fruit portions, such as fruit pulp can also supply the fruit solids component. Fruit pulp is the material remaining after fruit juices have been removed from fruit puree. Additionally useful herein for supplying the fruit solids are various fruit juices whether single strength or concentrated.

Fruit materials from any fruit can be used herein. Examples of such fruits useful herein include apricot, pineapple, lemon, orange, peach, pear, lime, banana, grape, mango, apple, tomato, blackberry, plum, watermelon, blueberry, raspberry, strawberry, current, cherry, cranberry, and mixtures thereof. Preferred fruits are selected from the group consisting of apples, strawberries, cherries, pears, blueberries, raspberries, grapes, oranges and mixtures thereof. Most highly preferred for use herein are grapes, strawberries, pears, oranges and cherries. Concentrated pear juice or white grape juice are highly preferred due to their low cost, white or neutral appearance and bland flavor. Such neutral features allow for addition of particular flavors and colors to provide particular products of desired color and flavor.

Fresh fruit is, of course, useful for preparing the products herein. However, previously frozen fruit, canned fruit, partially dehydrated fruit or rehydrated fruit, as well as frozen juices, concentrates, nectars, powders or frozen juice pulps are also suitable for use herein. When frozen fruit is employed, e.g., "four plus one" strawberries, i.e., frozen strawberries with one quarter part by weight added sugar, only the fruit solids contribution is to be considered.

While the present invention is primarily directed towards fruit containing products, the skilled artisan will appreciate that the present invention is equivalently applicable to all edible plant solids, especially ordinary garden-variety vegetables. The sugars, flavors, acids, pectinaceous or cellulosic fibers and ash of which plant solids are typically comprised are intended to be included within the term edible plant solids. However, "edible plant solids" is not intended to include such starch fractions as wheat or other cereal flours nor oleaginous materials such soybean oil. That is, the present fruit solids can be wholly or partially replaced with equivalent amounts of ordinary garden vegetable solids. However, vegetable flavored products are not nearly as popular as those, which are fruit, flavored. However, certain vegetables, e.g., pumpkin, squash and carrot enjoys some popularity as novelty items.

Also useful herein are fruit juice solids especially from inexpensive fruit sources such as grape juice, apple juice, and pear juice. If present, such juice solids can constitute about 0.1 to about 70% of the finished fruit snack products herein.

In even more preferred embodiments, the present compositions essentially comprise from about 5 to 100% (dry weight basis) of the nutritive carbohydrate sweetener component of fruit or plant solids. That is, if 100 g of an intermediate moisture product has a total sweetener component of 60% (wet basis), then in the preferred embodiment, at least 3 g thereof are provided from fruit solids. Better results in terms of natural flavor and color but at economical costs are obtained when the fruit solids are present at from about 5 to 25% of the sweetener component. Best results are obtained when the fruit solids are comprise about 5 to 15% of the nutritive carbohydrate sweetener component.

If desired, the present compositions and present intermediate moisture products can additionally comprise supplemental high potency sweeteners such as saccharine, aspartame, thaumatin, potassium acetylsulfame, sucralose, and mixtures thereof. Other suitable high potency sweeteners that become permitted for use or commercially available from time to time can also be used.

Thickening Agent

The present intermediate moisture food compositions further essentially comprise about 0.5% to about 5% of a thickening agent. Useful hydrophilic colloids or gelling agents herein include, for example, pectin, agar, carrageenan, starches, gelatin, xanthan gum, locust bean gum, konjac flour and mixtures thereof. Preferred hydrophilic colloids can be selected from the group consisting of pectin, starch, agar, xanthan gum and mixtures thereof. The first portion can comprise from about 0.5% to 12% of the portion of the hydrophilic colloid, preferably about 1% to 8% and for best results about 2% to 6%. The particular hydrophilic colloid concentration value can depend upon such factors as particular material employed, moisture content, and desired organoleptic attributes. It should be appreciated that the finished product forms are thickened plastic or pliable masses and are to be distinguished from certain popular gelled products fabricated by conventional starch molding.

Moisture

The present intermediate moisture finished products essentially comprise about 7% to 22% moisture, preferably about 7% to 17% moisture and for best results about 9-15%. This moisture level in combination with the high level of sweeteners result in finished products having an "intermediate" water activity ("$A_w$") ranging from about 0.4 to 0.70, preferably about 0.5 to 0.65 and for best results about 0.55 to 0.6.

It is an advantage herein that the hot slurry intermediate compositions of the present invention are provided at near finished Brix requiring little finish drying and thus are characterized by equal or only slightly higher moisture contents ranging from about 9% to 15%.

Optional Ingredients

In one highly preferred embodiment, the carbohydrate ingredient is supplied at least in part by a bodying agent. The bodying agent can serve to add both bulk and body and, most importantly, provide additional solids so as to enable the realization of fruit compositions having moisture contents within the essential ranges given herein. Especially useful herein as bodying agents are maltodextrins. Generally, the maltodextrin component is present at from about 0.1% by weight to about 50% by weight. Superior results in terms of sweetness balancing and prevention of crystallization are obtained when the maltodextrin component is present in the compositions at from about 3 to 45% by weight. For best results, however, the maltodextrin component should be employed at from about 10 to 40% of the dried fruit composition.

The bland maltodextrin provides minimal sweetness. Thus, low D.E. (dextrose equivalent) maltodextrin should be employed. By low D.E. is meant a maltodextrin with a D.E. of less than about 20. Low D.E. maltodextrins are commercially available and the skilled artisan will have no difficulty in selecting suitable maltodextrins for use herein. Generally, however, maltodextrins can be obtained by dextrinization of starch, particularly corn starch. Enzymatic hydrolyzates, optionally under acidic conditions, of the starch can be used; the conditions are so mild that negligible repolymerization occurs. This is in contrast to dextrins which typically are made from starch by hydrolyzates and repolymerization by using high temperature and pressure by dry heating or roasting of the starches (pyro dextrins). Such materials are well known (see, for example, U.S. Pat. No. 3,586,513, issued Jun. 22, 1972 to H. E. Horn et al. and U.S. Pat. No. 4,335,155, issued Jun. 15, 1982 to Blake et al.), and are widely available in the food industry.

Another class of materials useful herein as bodying or bulking agents are hydrogenated starch hydrolyzates which are commonly referred to as "polydextrose." Polydextrose provides an added advantage of being a low calorie material, i.e., having about one calorie per gram as opposed to about four calories per gram for most carbohydrates.

Calcium Phosphate Salt

The present food compositions and products fabricated therefrom can optionally further comprise an insoluble calcium salt of defined particle size in an amount effective to provide the desired calcium enrichment. Good results are obtained when the present fruit snack compositions and products contain about 50 to 1500 mg calcium per one oz (0.15 to 5.5% calcium). Better results are obtained when the calcium is present at levels of about 90 to 500 mg/oz (wet basis) of product (0.7 to 4.2%). For best results, the total calcium present ranges from about 90 to 200 mg per ounce (0.7 to 1.05%) of finished fruit product. Excessive calcium fortification is to be avoided in part because the finished product can exhibit an undesirable sticky and chalky texture somewhat like taffy.

Soluble calcium salts typically are expensive and contain low weight percentages of calcium. While calcium chloride is an exception to this generalization, addition of significant calcium levels supplied by calcium chloride impart an unacceptable salty and bitter flavor to dried sweetened fruit products. Suitable calcium ingredients include calcium carbonate and various calcium phosphate salts especially tricalcium phosphate.

Useful herein as the source of supplemental calcium is calcium phosphate. Calcium phosphate is generally available as a monobasic $(CaH_4(PO_4)_2H_2O)$, dibasic $(CaHPO_4 2H_2O)$ or tribasic $(Ca_3(PO_4)_2)$ salts. Preferred for use herein is tricalcium phosphate, $Ca_3(PO_4)_2$, ("TCP") because of its high weight percentage of calcium (about 38%). Moreover, TCP is slightly more soluble than other calcium phosphate salts.

A useful tricalcium phosphate starting material is also known as tribasic calcium phosphate or tricalcium orthophosphate and is available in food chemicals codex grade from Monsanto or Rhone Poulenc, having the general formula $3Ca_3(PO_4)_2Ca(OH)_2$. This product provides an assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also available from Stauffer in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

Phosphate salts are a preferred source of calcium, not only because of their acid solubility and weight ratios, but also because they are available commercially as a precipitate from whey, a natural dairy product.

The skilled artisan will appreciate that while the present calcium phosphate salts are characterized herein as insoluble, of course, some small percentage will dissolve in water depending in part upon the temperature and pH. However, at the concentrations of calcium salt used both in the slurry and the dried fruit composition products herein, the great percentage is in a solid state.

Unfortunately, other calcium salts that might otherwise be thought as useful but cannot be employed for one reason or another include, calcium ascorbate (too expensive), calcium citrate (creates a chalky product and imparts a bad aftertaste), calcium carbonate (too effervescent and imparts a bad off-flavor), calcium gluconate (too expensive), calcium lactate (too expensive and bad flavor), and calcium sulfate (too strongly flavored).

Fat

Certain embodiments additionally can optionally comprise a fat (oil and/or solid) i.e., an edible fatty triglyceride. The fat component additionally affects the eating qualities of the present compositions. Inclusion of fat increases the shortness of the texture as well as reduces modestly the stickiness of the composition to the consumer's teeth. The fat ingredient can also assist in minimizing interaction between any oil soluble flavors included and the insoluble calcium ingredient.

The fat can comprise preferably about 0.1 to 12%, more preferably 3 to 7% and for best results about 4% to about 6% of the composition. Useful herein are fats and oils that are conventional for use in food products, especially for confections. Both conventional fatty triglyceridic materials such as oils and solid fats can be used herein as well as blends of fats and oils. Also useful herein are fats, especially partially hydrogenated oils such as canola, corn oil, safflower, soybean, coconut, cottonseed or fractionated oils, all of which have melting points above room temperature. Less preferred are animal derived fats. Employment of such particular fats is preferred due to a reduced tendency of the glyceridic component to grease out of the present fruit compositions. In other preferred variations, the oils are selected to have and provide higher levels of medium chain tryglycerides. While not proven and not universally accepted, it is believed by many in the art that the presence of medium chain tryglycerides beneficially enhances the bioavailability of calcium phosphate salts possibly by increasing calcium absorption. One suitable oil that provides high levels of such medium chain tryglycerides is canola oil.

In preferred embodiments, the fat component can additionally include lecithin and other emulsifiers, e.g., acetylated mono-glycerides, if desired.

Oil Soluble Flavors

Optionally, the present gel food products can further additionally include effective amounts of oil soluble flavor(s). Selection of oil soluble flavors to the exclusion of conventional water-soluble flavors has been found important to minimization of undesirable adverse interaction between the flavor and the calcium, if present. Such interaction can lead to the development of undesirable flavors as well as the loss of intensity of desired flavors. Indeed, calcium fortified embodiments of the present gel products are preferably free of added water-soluble, or alcohol, propylene glycol or glycerine-based flavors. (The last two may be in combination with oil-based flavors.). However, those embodiments that are not calcium fortified can beneficially comprise water soluble flavors.

If present, such oil soluble flavors can comprise effective amounts of such oil soluble flavors to provide desired flavor levels. Good results are generally obtained when the oil soluble flavors are present at from about 0.01% to about 2% of the finished products.

Additional Minor Ingredients

The present food compositions can optionally contain a variety of additional minor ingredients suitable for rendering such products more organoleptically acceptable, more nutritious and/or more storage stable. While not essential to the present food compositions, such optional components include fiber materials, high potency sweeteners, colors, coloring agents, vitamins, preservatives (e.g., sodium bisulfite), emulsifiers, calcium carriers (e.g., propylene glycol), dairy products (e.g., non fat dairy solids), and the like. Of course, highly preferred for use herein are "natural" ingredient additives. The present formulations can be fortified with various botanicals, nutriceuticals, and other nutrition or therapeutic ingredients, if desired. In certain variations, the products can be used as edible carriers for various drug ingredients.

Acidulant

In preferred embodiments, the present compositions further essentially comprise sufficient amounts of an edible organic acid or acidulant to provide the gel with a pH of about 3.0 to 5.5, preferably about 3.2 to 4.5, and for best results about 3.2 to 3.6. The particular pH selected from within this pH range depends in part upon the type of gelling ingredient employed as well as the organoleptic attributes desired. For example, in the preferred embodiment that contains high levels of fruit, the preferred pH range varies from about 3.2 to about 3.5. Good results are obtained when the edible organic salts are employed at levels ranging from about 0.1 to 1& preferably about 0.2% to about 0.8%.

A variety of edible organic acids can be used to adjust the pH of the present invention as well as to control the taste and tartness of the present products. Especially suitable for use herein are citric acid, tartaric acid, malic acid, lactic acid, fumaric acid, ascorbic acid and mixtures thereof especially in the form of sodium or potassium salts. In addition to providing a desired tartness to the flavor, such acidulants can affect the strength of the pectin gelling component.

In still another variation, the present products can further comprise about 0.15 to 10% inulin, preferably about 0.5% to 5% in partial substitution for the nutritive carbohydrate sweetening agents. Inulin or equally suitable like fructo oligo saccharides ("FOS") ingredients provide the benefits of soluble fiber without the adverse organoleptic or allergen features of such other soluble fiber materials such as oat bran, psyllium, beta glucan, and guar gum. Moreover, it is believed that inulin and/or FOS materials facilitate the absorption of calcium when provided in the form of calcium phosphate salts. It is an advantage herein that inulin and FOS materials behave in a manner similar to sugars which allows for ease of use and incorporation. Thus, inulin can conveniently be added to fruit and sugars blend in partial substitution therefor. Also, inulin's bland flavor makes inulin particularly suitable for use in children's products since children are notoriously sensitive to off flavors. Moreover, it is believed that there is a synergistic effect when both inulin and medium chain triglycerides are both present on the absorption of calcium from calcium phosphate salts.

Since the target consumers for the fruit gel food products are children, especially young children, in the preferred embodiment, the present products are desirably free of alcohol. It will be appreciated that trace amounts of alcohol may be present such as provided by the flavor component. Thus, alcohol free products herein will have less than 0.1% alcohol. Of course, those embodiments intended for sale for adults can comprise 0.5% to about 10% alcohol such as provided from various flavored liquors or other alcohol bearing ingredients.

The finished products are formed into suitably sized and shaped pieces. In a preferred embodiment, the pieces are in sheet or roll form and sized ranging from about 1 to 8 g each. The items are packaged in suitable packaging to minimize moisture gain or loss during extended room temperature storage such as pouches fabricated from flexible packaging film.

The present invention is illustrated by the following:

EXAMPLE 1

| Ingredient | Overall % |
| --- | --- |
| 63 DE Corn Syrup | 10% |
| White grape puree | 17% |

-continued

| Ingredient | Overall % |
| --- | --- |
| Shortening | 6% |
| Carrageenan | 4% |
| Strawberry Flavor | 1% |
| Red Color | 1% |
| Maltodextrin | 27.1% |
| Tri Calcium Phosphate | 1% |
| Powdered Sugar | 30% |
| Citric Acid | 1.4% |
| Sodium Citrate granular | 1% |
| Ascorbic Acid | 0.5% |
| Total | 100.00% |

A 15 lb batch is heated and mixed in a jacketed, covered kettle with a disperser unit until the temperature reaches 185° F. The product is held and mixed at this temperature for an additional 30 minutes. The product is then discharged for forming.

EXAMPLE 2

| Ingredient | Overall % |
| --- | --- |
| Corn syrup | 30.0% |
| Corn syrup dried | 30.6% |
| Pear puree concentrate | 5.3% |
| Sugar | 19.5% |
| Shortening | 5.0% |
| Pectin blend | 4.0% |
| Citric acid | 1.5% |
| Sodium citrate | 1.5% |
| Red color | 0.5% |
| Monoglycerides | 0.5% |
| Strawberry flavor | 1.0% |
| Malic acid | 0.3% |
| Ascorbic acid | 0.3% |
| Total | 100.000% |

A 15 lb batch is heated and mixed in a jacketed, covered kettle with a disperser unit until the temperature reaches 185° F. The product is held and mixed at this temperature for an additional 30 minutes. The product is then discharged for forming.

The invention claimed is:

1. A method for forming sweetened, pliable food products, comprising:
    forming a hot, sweetened, intermediate moisture flowable confectionary composition by admixing a saccharide component, a bulking ingredient, a hydratable thickener, and moisture to form a wet blend;
    heating the wet blend, without moisture addition, to form a hot wet blend;
    forming a viscous hot sweetened flowable confectionary composition by working the hot wet blend until the thickeners are fully hydrated, establishing a viscosity of about 500,000-2,000,000 cps and a water activity of 0.65 or less;
    cutting the viscous hot sweetened flowable confectionary composition into individually shaped and sized pieces; and
    cooling the pieces to form solid, sweetened, pliable food products.

2. The method of claim 1 wherein the step of forming the hot, sweetened, intermediate moisture flowable confectionary composition is performed without drying.

3. The method of claim 1 wherein the hydratable thickener is admixed in dry form.

4. The method of claim 1 wherein the working step is practiced for about 20-60 minutes.

5. The method of claim 4 wherein the working step is practiced with vigorous agitation.

6. The method of claim 1 wherein the viscous hot sweetened flowable confectionary composition has a solids content ranging from 83-93° Brix.

7. The method of claim 1 practiced to form pieces in the form of rolls, coiled strips, sheets, bars, strings and combinations thereof.

8. The method of claim 7 wherein the pieces are in sheet form having a thickness ranging from about 0.2 to 1.5 mm.

9. The method of claim 1 practiced to form of an individual piece having a thickness of 0.5 to 1.5 mm mounted on an inedible substrate.

10. The method of claim 9 wherein the piece is in the form of a roll.

11. The method of claim 10 in the form of a roll having a length of about 500 to 1500 mm, a width of about 10 to 30 mm mounted on an inedible film or paper substrate having a width of about 30 to 34 mm, said roll having about 5 to 15 turns.

12. The method of claim 1 wherein the admixing step includes preparing a dry pre-blend of ingredients and a wet pre-blend of ingredients.

13. The method of claim 12 wherein at least a portion of the hydratable thickener is added in dry form to the wet pre-blend of ingredients.

14. The method of claim 1 additionally comprising: packaging the food product in a moisture resistant food package at least partially fabricated from a flexible packaging film.

15. The method of claim 1 practiced without adding of a gel setting ingredient or an acidulant.

16. The method of claim 1, wherein forming the individually shaped and sized pieces includes establishing a continuous feed of the viscous hot sweetened flowable confectionary composition for cutting.

17. The method of claim 16, wherein the viscous hot sweetened flowable confectionary composition is continuously fed through forming rollers.

18. The method of claim 1, wherein the individually shaped and sized pieces are formed by directly cutting the viscous hot sweetened flowable confectionary composition following the working step.

19. The method of claim 18, wherein heating the wet blend occurs at a temperature ranging from about 70 to 100° C.

20. The method of claim 19, wherein working the hot wet blend is performed for at least 20 minutes.

* * * * *